April 17, 1962 G. W. KOCALIS 3,030,075
LINE TENSIONING AND HOLDING DEVICE
Filed June 16, 1959 3 Sheets-Sheet 1
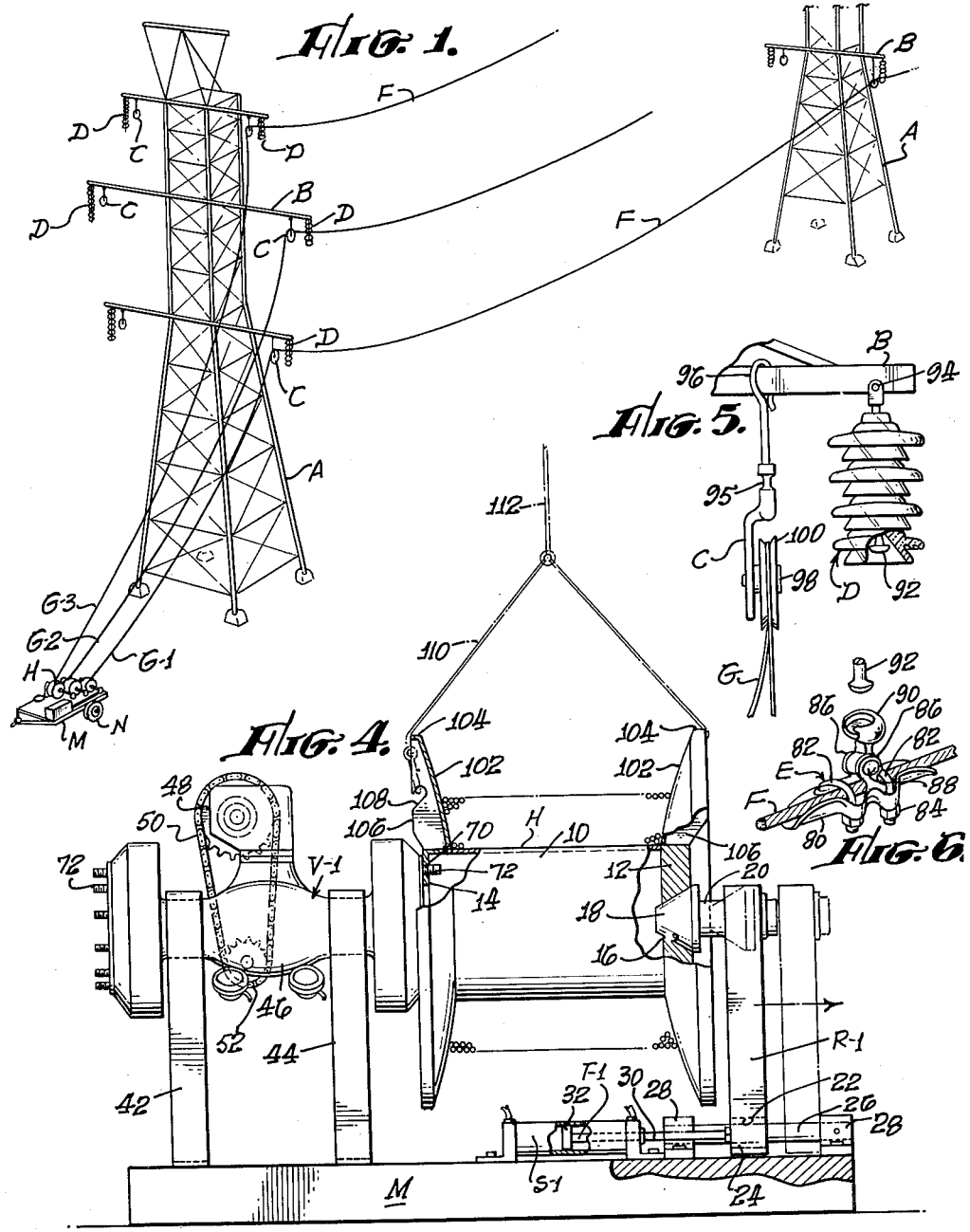
GEORGE W. KOCALIS,
INVENTOR.
By William C. Babcock
ATTORNEY.

April 17, 1962 G. W. KOCALIS 3,030,075
LINE TENSIONING AND HOLDING DEVICE
Filed June 16, 1959 3 Sheets-Sheet 2
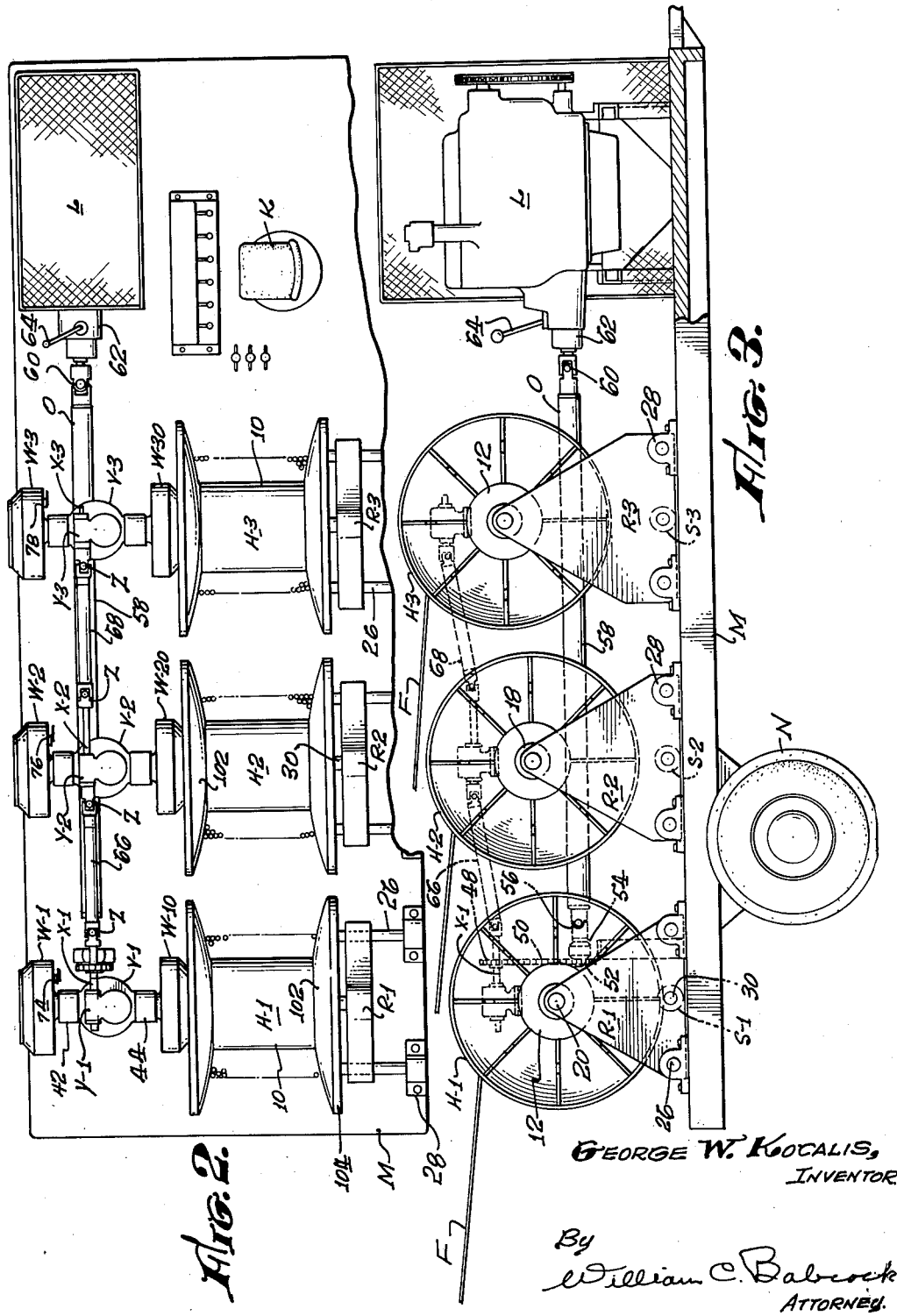
George W. Kocalis,
INVENTOR
By William C. Babcock.
ATTORNEY.

April 17, 1962    G. W. KOCALIS    3,030,075
LINE TENSIONING AND HOLDING DEVICE
Filed June 16, 1959    3 Sheets-Sheet 3

GEORGE W. KOCALIS,
INVENTOR.

BY
William C. Babcock
ATTORNEY.

United States Patent Office 3,030,075
Patented Apr. 17, 1962

3,030,075
LINE TENSIONING AND HOLDING DEVICE
George W. Kocalis, 2105 Findley, Monterey Park, Calif.
Filed June 16, 1959, Ser. No. 820,619
1 Claim. (Cl. 254—134.3)

The present invention relates to the construction field, and more particularly to a mobile apparatus that may be moved along a sequence of towers on which high voltage line are being strung to draw these lines through pulleys removably affixed to cross arms on these towers and thereafter maintain desired tensions on the lines as they are transferred from the pulleys and permanently affixed to insulators also mounted on the arms.

As is well known, high voltage lines frequently extend through rough and mountainous terrain in remote areas, and are supported at relatively high elevations aboveground by insulators that are mounted on the cross arms of spaced apart towers. In remote areas the cost of installing such towers, as well as raising and supporting the high voltage lines therefrom, is abnormally high, for a variety of skilled workmen must be transported relatively long distances each day to the job site whereby it frequently occurs that but two or three hours of actual work can be accomplished each day. Accordingly, to minimize construction and installation costs of high voltage lines, it is highly desirable that this work be accomplished with a minimum number of employees and as rapidly as possible.

A major object of the present invention is to provide a mobile apparatus, operable by one man, that can be moved along a sequence of towers on which it is desired to mount a number of high voltage lines, which apparatus is adapted to be used in first drawing pull lines connected to high voltage lines through a sequence of pulleys supported from the towers, and thereafter draw the high voltage lines through the pulleys to position same adjacent insulators to which they will be permanently affixed.

A still further object of the invention is to not only draw the pull lines through the tower-supported pulleys, but to individually wind each of said pull lines on a separate spool that is removably mounted on the apparatus and can be easily and quickly removed therefrom and an empty spool immediately substituted therefor.

Yet another object of the invention is to not only wind the pull lines on individual spools, but to maintain desired tensions on the pull lines and high voltage lines connected thereto to permit the high voltage lines to be permanently affixed to successive supporting insulators with the desired sag therebetween.

These and other objects and advantages of the invention will become apparent from the following description of a preferred form thereof and from the accompanying drawings illustrating same in which:

FIGURE 1 is a perspective view of two towers having cross arms from which pulleys depend through which the present invention draws pull lines and high voltage lines and maintains tension thereon until said high voltage lines are transferred from said pulleys and permanently affixed to insulators depending from said arms;

FIGURE 2 is a top plan view of the apparatus;

FIGURE 3 is a side elevational view of the device shown in FIGURE 2;

FIGURE 4 is a side elevational view of the device shown in FIGURE 3;

FIGURE 5 is a partial side elevational view of a cross arm on a tower showing a pulley removably affixed thereto, and an insulator also depending from the cross arm that supports said high voltage line when transferred thereto from said pulley;

FIGURE 6 is a perspective view of a clamp that rigidly engages said high voltage line and supports same from an insulator; and, FIGURE 7 is a diagrammatic view of a hydraulic system capable of being used on the invention.

Figure 7:
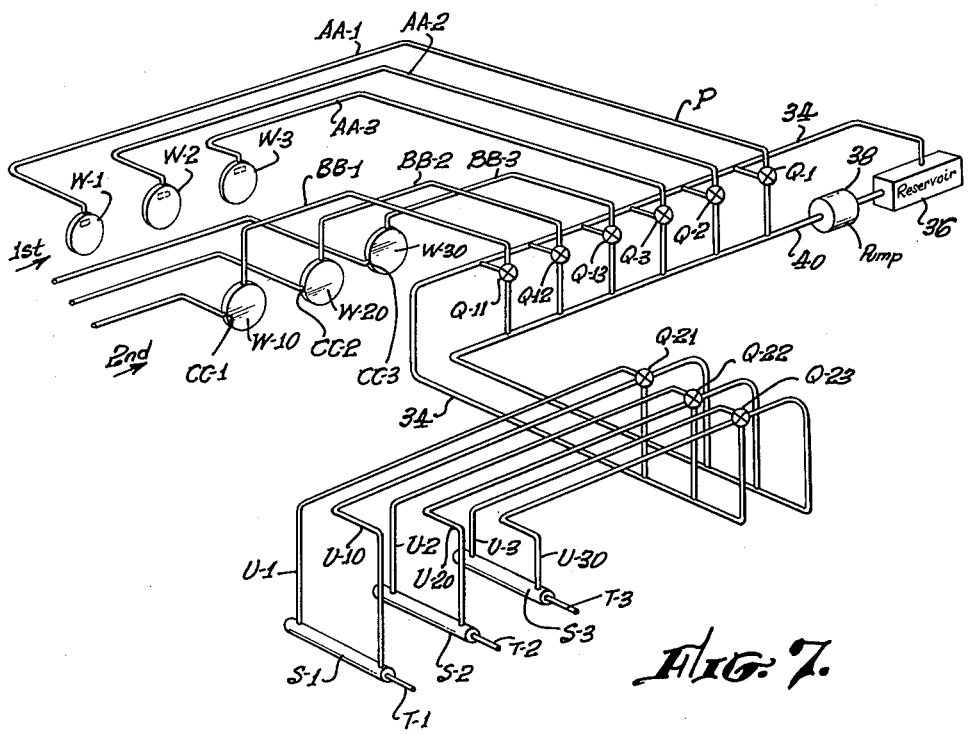

With further reference to the drawings for the general arrangement of the invention, two towers A are shown in FIGURE 1, each of which has a number of cross arms B mounted in elevated positions thereon from which a number of pulleys C are removably supported. Each of the pulleys C is positioned adjacent an insulator D that depends from one of the cross arms. Each insulator D includes a shoe-type clamp E, best seen in FIGURE 6, that is adapted to permanently engage a high voltage line F to permanently support same when the shoe is affixed to one of the insulators D.

The pulleys C, as can best be seen in FIGURE 5, are preferably open at the top to permit easy transference of high voltage lines F therefrom to a supported position below the insulators D. When the towers A are erected, pulleys C are positioned thereon and a pull line G is threaded onto the pulleys from a helicopter (not shown) or by lines looped over the pulleys which depend downwardly therefrom in a U-shaped configuration. The free ends of the looped lines are knotted or otherwise connected to one another to form a continuous pull line whereby high voltage lines from rotatably supported reels (not shown) may be drawn through the pulleys C to positions adjacent the insulators D.

Prior to development of the present apparatus, numerous pieces of equipment were required, each of which necessitated the use of one or more men to operate, to sequentially draw the pull lines through the pulleys and thereafter draw the high voltage lines F through the pulleys to positions adjacent the insulators D. Also, additional equipment was required to maintain tension on the high voltage lines after being so disposed before transfer thereof from the pulleys to permanent connection on the insulators. The present invention eliminates the use of the many pieces of equipment formerly required, for a single operator by means of this apparatus may wind any desired number of separate pull lines G independently on separate spools H to draw high voltage lines F affixed thereto through the pulleys C to positions adjacent insulators D.

The spools H are power driven on the apparatus, as will hereinafter be described in detail, and by the use of hydraulically operated and mechanically operated brakes, a single operator can control the above described operation from a location on the invention adjacent a seat K provided thereon, as shown in FIGURE 2. A prime mover L, such as a conventional internal combustion engine is mounted on an elongate frame M such as the chassis of a truck, or the like, and this frame is movably supported by a number of pneumatic tired wheels N, as may be seen in FIGURE 3. When engine L is actuated the power transmission system, designated generally by the letter O in FIGURES 2 and 3, provides motive power for the rotation of spools H disposed above frame M, as will be described in detail hereinafter.

A hydraulic system P is provided that is mounted at a convenient location on frame M, and includes a number of manually operable valves Q-1, Q-2 and Q-3, any one of which when placed in a first position causes rotation of one of the spools H-1, H-2 or H-3 associated therewith. A second group of manually operable valves Q-11, Q-12 and Q-13 when manually placed in predetermined positions, serves to hydraulically lock spools H-1, H-2 and H-3 respectively in such positions as to maintain desired tensions on pull lines G-1, G-2 and G-3 wound on spools H-1, H-2 and H-3 respectively.

Three transversely movable supports R-1, R-2 and R-3 are mounted on frame M which assist in rotatably supporting spools H–1, H–2 and H–3 respectively above the frame. Each of the supports R–1, R–2 and R–3 is transversely movable relative to frame M by the use of three hydraulic cylinders S–1, S–2 and S–3 respectively having piston rods T–1, T–2 and T–3 extending therefrom that are connected to the supports R–1, R–2 and R–3. A group of valves Q–21, Q–22 and Q–23 connected to conduits later to be described permits fluid to be discharged into and out of any one of the hydraulic cylinders S–1, S–2 and S–3 respectively, to move the piston rods T–1, T–2 and T–3 with concurrent movement of the supports R–1, R–2 and R–3 connected thereto.

Thus, it will be seen that with the groups of valves above described situated adjacent seat K, a single operator when either mounted on the seat or standing adjacent thereto can control the power rotation of any one or all of the spools H–1, H–2 and H–3, and can lock any one or all of the spools in fixed, non-rotatable position to maintain tension on the pull lines G–1, G–2 and G–3. Also from this position the operator (not shown) can control the transverse movement of supports R–1, R–2 and R–3 to rotatably support the spools above frame M, or to permit disengagement of the spools from their supports to be replaced by empty spools, as will be described hereinafter.

Although various types of spools H, further identified individually herein for the sake of clarity as H–1, H–2 and H–3 (FIGURES 2 and 3), can be used with the apparatus of the present invention, the structure of the spool shown in FIGURE 4 has been found particularly desirable for this purpose. The spool as shown in FIGURE 4 comprises a cylindrical shell 10, one end of which is closed by a first end piece 12, with the opposite end being closed by a second end piece 14 in the form of a heavy circular plate. End piece 12 is of substantial thickness and is provided with a first engageable means which is a centrally disposed, inwardly extending tapered bore 16 adapted to be engaged by a first engaging means that is a complementary tapered plug 18 which is rotatably supported by conventional means on the inner end of a horizontally extending stub shaft 20.

Stub shafts 20, as can best be seen in FIGURES 2, 3 and 4, are welded or otherwise affixed to the upper end portions of supports R–1, R–2 and R–3, which are preferably triangular in shape. Each of the supports R–1, R–2 and R–3 has two horizontally aligned, spaced bores 22 formed in the lower portions thereof in which sleeves 24 are rigidly mounted. Sleeves 24 are slidable on suitably spaced, transversely and horizontally positioned elongate guides 26, preferably in the form of rods, that are supported at slightly elevated positions above frame M by two identical mountings 28 which engage the end portions thereof (FIGURE 4). Mountings 28 are preferably of the block type and in addition to supporting guides 26, also serve as stops to limit the transverse movement of supports R–1, R–2 and R–3. Each pair of guides 26, as can be seen in FIGURES 3 and 4, has a piston rod 30 transversely disposed therebetween. One end of each rod 30 terminates in a piston 32. Each piston 32 is slidably disposed in one of the three hydraulic cylinders S–1, S–2 and S–3 that are bolted or otherwise affixed to frame M (FIGURE 4). The ends of rods 30 opposite those supporting pistons 32 are connected to the lower portions of supports R–1, R–2 and R–3.

Conduits U–1, U–10; U–2, U–20; and U–3, U–30 are connected to opposite interior end portions of cylinders S–1, S–2 and S–3 respectively, as well as to valves Q–21, Q–22 and Q–23, as may best be seen in FIGURE 7. Valves Q–21, Q–22 and Q–23 also communicate with a conduit 34 that extends therefrom to a reservoir 36 from which hydraulic fluid is withdrawn to be placed under pressure by a suitable power driven pump 38. The power for pump 38 may be furnished by an auxiliary source (not shown) or from the prime mover L, should it be so desired. Valves Q–21, Q–22 and Q–23 are of such design that when any one of them is manually placed in a first position, fluid is discharged through the conduit U–1, U–2 or U–3 to flow into the associated cylinder S–1, S–2 or S–3 and force one of the supports R–1, R–2 or R–3 outwardly relative to the spool H–1, H–2 or H–3. This outward movement of a support R–1, R–2 or R–3 permits the spool H–1, H–2 or H–3 associated therewith to be disengaged from the supporting plug 18.

When one of the valves Q–21, Q–22 or Q–23 is manually placed in this first position, flow of fluid from cylinders S–1, S–2 or S–3 as the case may be, takes place through one of the lines U–10, U–20 or U–30 to flow into the conduit 34 leading to the reservoir 36. Upon one of the valves Q–21, Q–22 or Q–23 being manually placed in a second position, the flow of fluid through the valves is reversed and the piston 32 in the cylinder S–1, S–2 or S–3 associated with the manipulated valve is caused to reverse its direction of movement and one of the supports R–1, R–2 or R–3 moves inwardly to place one of the plugs 18 in an engaging position with the bore 16 in one of the spools H–1, H–2 or H–3. Fluid under pressure is constantly supplied to valve Q–21, Q–22 or Q–23 from a manifold 40 that extends from the discharge side of pump 38.

Three conventional truck differential gear mechanisms or units V–1, V–2 and V–3 are transversely positioned above the frame M and are in coaxial alignment with the longitudinal axis of spools H–1, H–2 and H–3, as best seen in FIGURE 2. A pair of identical uprights 42 and 44 are provided for each of the differential gear mechanisms V–1, V–2 and V–3 that rigidly support them in the positions previously described as by welding or the like. The differential gear mechanisms V–1, V–2 and V–3 include identical elongate housings 46 having conventional gear mechanisms (not shown) disposed within the confines thereof, which by oppositely positioned axles (not shown), are adapted to rotate pairs of wheel-supporting drums W–1, W–10; W–2, W–20; and W–3, W–30 respectively.

Differential gear mechanisms V–1, V–2 and V–3 also have a power input drive shaft X–1, X–2 and X–3 respectively that are journaled in portions Y–1, Y–2 and Y–3 of the differentials and extend longitudinally therethrough. A driven sprocket 48 is rigidly affixed to shaft X–1. Sprocket 48 is engaged by an endless link belt 50 that extends downwardly to a driving sprocket 52. Sprocket 52 is rigidly affixed to a first shaft 54 that is connected by a universal joint 56 to the rear end of a driving shaft 58 extending longitudinally relative to frame M and situated thereabove. The forward end of shaft 58 is connected to a second universal joint 60 that in turn is connected to a transmission 62 operatively associated with the prime mover L, through which transmission rotational power is transmitted to shaft 58. As is conventional with such devices, transmission 62 has a manually operable gear shift lever 64 projecting upwardly therefrom to control to a degree the rate of rotation of shaft 58, as well as the power injut from the prime mover L thereto.

The adjacent end portions of shafts X–1, X–2 and X–3 are provided with identical universal joints Z which are connected to two drive shafts 66 and 68 respectively (FIGURE 2). Thus, as driving sprocket 48 is rotated, the power input shafts X–1, X–2 and X–3 of differentials V–1, V–2 and V–3 respectively are power rotated to cause rotation of the pairs of drums W–1, W–10; W–2, W–20; and W–3, W–30. Each pair of drums W–1, W–10; W–2, W–20; and W–3, W–30 are provided with hydraulically actuated brakes, not shown in detail, which are actuated by hydraulic fluid under pressure conducted thereto through the piping system shown in FIGURE 7. The hydraulic brakes on the first group of drums W–1, W–2 and W–3 are connected by conduits AA–1, AA–2 and AA–3 to valves Q–1, Q–2 and Q–3 respectively, which valves also communicate with conduit 40. The second group of drums W–10, W–20 and W–30 have hydraulic actuated brakes mounted thereon connected by conduits BB-1, BB-2 and BB-3 respectively connected to valves Q-11, Q-12 and Q-13.

Valves Q-1, Q-2, Q-3 and Q-11, Q-12, Q-13 are of such design that they are normally closed to prevent fluid flow from conduit 40 to the brakes on drums W-1, W-2, W-3, W-10, W-20 and W-30, but when so closed relative to conduits AA-1, AA-2, AA-3 and BB-1, BB-2, BB-3 to maintain same in communication with conduit 34 leading to reservoir 36. Thus, when the valves Q-1, Q-2, Q-3 and Q-11, Q-12, Q-13 are closed, no hydraulic pressure can be exerted on the brakes associated with drums W-1, W-2, W-3 and W-10, W-20, W-30. However, when any one of the valves Q-1, Q-2, Q-3, Q-11, Q-12 or Q-13 is manually placed in a first position, communication between the associated one of the conduits AA-1, AA-2, AA-3 and BB-1, BB-2, BB-3 is immediately terminated between it and the conduit 34, and hydraulic fluid is discharged under pressure through the associated one of the lines AA-1, AA-2, AA-3, BB-1, BB-2, or BB-3 to actuate a particular one of the hydraulic brakes. When the hydraulic brake on one of the drums W-1, W-2, W-3 is actuated, the oppositely disposed drum W-10, W-20, W-30, as the case may be, is caused to rotate if power is delivered to the differentials through the driving sprocket 48 by means previously described.

Each of the spools H-1, H-2 and H-3 has a number of circumferentially spaced bores 70 formed in the second end piece 14, which bores serve as the second engageable means on each of the drums. Bores 70 are adapted to be engaged by first engaging means in the form of a number of circumferentially spaced pins 72 that project from vertical faces of drums W-10, W-20, W-30 and occupy the same positions thereon which the threaded studs would occupy that are conventionally employed on such drums to removably hold a pneumatic-tired wheel in place thereon. By supporting the spools H-1, H-2, H-3 on pins 72 and plugs 18, the spools can be rotated at will by manual manipulation of valves Q-1, Q-2, Q-3 to wind the pull lines G thereon and effect raising and stringing of the high voltage lines F, as previously described in detail.

Frequently after the pull lines G have been wound on spools H-1, H-2, H-3, it is desirable to maintain tension thereon, as well as on the high voltage lines F that are supported on pulleys C, prior to being permanently affixed to insulators D. For this purpose valves Q-11, Q-12, Q-13 can be manually manipulated to hydraulically operate the brakes on the second drums W-10, W-20, W-20 to maintain the drums and spools associated therewith in a stationary position, whether the differentials V-1, V-2, and V-3 are operative or inoperative. Occasionally it may be desirable to maintain spools H-1, H-2, H-3 overnight in a braked position, and to supplement the braking afforded by the hydraulic brakes on drums W-10, W-20, W-30, these drums are provided with mechanical brakes CC-1, CC-2, CC-3, as shown in FIGURE 7. Brakes CC-1, CC-2, CC-3 are connected by linkage systems 74, 76, 78 respectively, to levers or other manual actuating means (not shown) located adjacent seat K that can be manipulated by the operator to maintain any one of the drums W-10, W-20, W-30 in a braked and locked position, together with the spools H-1, H-2, H-3 operatively associated therewith.

For convenience in winding individual pull lines G on spools H-1, H-2 and H-3, it has been found desirable that these spools be disposed at increasingly higher elevations, and accordingly the height of supports R-1, R-2, R-3, 42 and 44 increases as they progress forwardly from the rear end of frame M. After the pull lines have been wound on spools H-1, H-2, H-3 to draw lines F through pulleys C, a number of supporting clamps or shoes E of conventional design are affixed to each high tension line. Each shoe E includes a longitudinally slotted body 80 in which a portion of the high tension line is disposed, and pairs of longitudinally spaced transverse bores are formed in body 80 that engage opposite legs of a number of U-shaped clamping members 82. The legs of members 82 have threaded ends which are engaged by nuts 84. When nuts 84 are tightened they pull the U-shaped members 82 downwardly relative to body 80 whereby members 82 and body 80 frictionally engage the high voltage line F and maintain same in an immovable position.

Two laterally spaced lugs 86 project upwardly from each body 80 and a pin 88 extends transversely therethrough that pivotally supports an engageable supporting member 90 which may be removably placed in engagement with a downwardly depending engageable member 92 supported from the lower end portion of the insulator D, as shown in FIGURE 5. Insulator D is permanently affixed to one of the cross arms B by bolts 94, or the like. The supporting shoes or clamps E, as well as the insulator D, form no part of the present invention and are merely illustrated and described to demonstrate the manner in which the invention is utilized in raising high voltage lines to supported positions from the towers A.

The pulleys C (FIGURE 5) likewise form no part of the present invention, and in structure merely include an elongate supporting member 95 having a hook 96 or other means on the upper end portion thereof that is adapted to removably engage one of the cross arms B. The lower portion of member 95 has an outwardly projecting stub shaft 98 affixed thereto on which a grooved sheave 100 is rotatably supported. The groove in sheave 100 is sufficiently wide to accommodate the pull line G used in raising the high voltage line F, as well as the high voltage line after it has been pulled into a supported position on the sheave by use of spools H-1, H-2, H-3 as previously described in detail.

Each of the spools H-1, H-2 and H-3 is of the same structure, and in addition to the structure already described, includes two identical oppositely disposed, slightly outwardly convex, annular flanges 102 that terminate on the periphery thereof in rims 104. Flanges 102 project outwardly from shell 10, as best seen in FIGURE 4. A number of radially disposed ribs 106 are affixed to the outer faces of these flanges and extend between the rims 104 and shell 10. Ribs 106 on one flange 102 are aligned with the ribs on the oppositely disposed flange on the same shell 10. Each pair of opposing ribs have slots 108 formed therein, which when the ribs are in upwardly disposed positions, extend upwardly and inwardly toward one another. Slots 108 (FIGURE 4) are easily engaged by a cable sling 110 on a hoist line 112 to be raised from or positioned on the invention.

The use of the invention has been described above in conjunction with the description of the structure of the apparatus and need not be repeated.

Although the invention herein shown and described is fully capable of achieving the objects and providing the advantages hereinbefore mentioned, it is to be understood that it is merely illustrative of the presently preferred embodiment thereof and that I do not mean to be limited to the details of construction herein shown and described other than as defined in the appended claim.

I claim:

An apparatus adapted for use in sequentially pulling a plurality of high voltage lines connected to a plurality of pull lines through a plurality of supporting pulleys removably connected to a plurality of cross arms mounted on a plurality of supporting towers and maintaining desired tensions on said lines until said high voltage lines can be transferred from said pulleys to permanent supports on a plurality of electrical insulators that are affixed to said cross arms, including: an elongated rigid frame; means for movably supporting said frame; a plurality of differential gear units, each of which includes first and second brake drums as a part thereof; means for supporting said differential gear units transversely in longitudinally spaced relationship above said rigid frame; a prime mover; transmission means extending between said prime mover and said differential gear units for concurrently driving all of said differential gear units upon actuation of said prime mover; a plurality of spools in axial alignment with said differential gear units, each of which spools is capable of having one of said pull lines wound thereon; first engageable means on first ends of said spools; first engaging means on said first brake drums for removably engaging said first engageable means and supporting said first ends of said spools above said rigid frame, and for rotating said spools when said first brake drums are caused to rotate; second engageable means on second ends of said spools; second rotatably engaging means supported on said rigid frame and extending thereabove for engaging said second engageable means to support said second ends of said spools; and brake means for selectively stopping rotation of any of said first and second brake drums as said differential gear units are driven by said transmission means, which brake means when used to stop rotation of one of said second drums causes the first brake drum associated therewith therefrom to rotate, and rotate the one of said spools axially aligned with said differential gear unit of which said first brake drum forms a part, with said brake means when used to stop rotation of one of said first brake drums thereafter maintaining said first brake drum and said spool associated therewith in a non-rotatable position and said pull line on said non-rotatable drum in an anchored position thereon.

References Cited in the file of this patent

UNITED STATES PATENTS

| | | |
|---|---|---|
| 1,825,218 | Van Hook | Sept. 29, 1931 |
| 2,250,269 | Lockwood | July 22, 1941 |
| 2,413,909 | Clement et al. | Jan. 7, 1947 |
| 2,837,295 | Todd et al. | June 3, 1958 |
| 2,857,137 | Fillion | Oct. 21, 1958 |